INVENTOR
W. R. CARROLL
BY A. F. Kane
ATTORNEY

INVENTOR
W.R. CARROLL
BY A. F. Kane
ATTORNEY

Sept. 4, 1956 W. R. CARROLL 2,761,922
AUTOMATIC TRANSMISSION MEASURING CIRCUIT FOR SUCCESSIVELY
TESTING THE IDLE TRUNKS IN A GROUP OF TRUNKS
Filed June 20, 1955 3 Sheets-Sheet 3

INVENTOR
W. R. CARROLL
BY A. F. Kane
ATTORNEY

United States Patent Office 2,761,922
Patented Sept. 4, 1956

2,761,922

AUTOMATIC TRANSMISSION MEASURING CIRCUIT FOR SUCCESSIVELY TESTING THE IDLE TRUNKS IN A GROUP OF TRUNKS

William R. Carroll, Richmond, Va., assignor to American Telephone and Telegraph Company, a corporation of New York Application June 20, 1955, Serial No. 516,362

7 Claims. (Cl. 179—175.3)

This invention relates to transmission measuring systems and particularly to improved automatic measuring means for detecting and recording deviations, from a predetermined level, in the transmission level of each of a plurality of speech transmission circuits.

In known transmission measuring systems, it is customary to test each of a group of signalling circuits, such as toll, intertoll and long distance telephone circuits, at stated intervals of time, and generally such tests require the application of a single frequenvy tone current to the distant end of the circuit for transmission thereover to the local office at which the tests are being supervised. The testing of such circuits, in accordance with this procedure, necessitates that the busy or idle condition of each circuit be first ascertained and then, if the circuit to be tested is found to be idle, the test source of single frequency tone current is connected to the idle circuit at its distant end. This latter step requires the cooperation of test men, operators or other personnel at each end of the circuit, or otherwise involves complex circuitry and apparatus for connecting the tone source to the circuit to be tested.

It is one object of this invention to simplify and otherwise improve the procedure required in making transmission measurements on toll or long distance telephone circuits, particularly with a view towards increased accuracy and speed in the testing of large groups of speech transmission circuits.

In accordance with a particular feature of the invention, whereby simplification and increased speed in transmission measuring on a plurality of telephone trunk circuits are attained, a single frequency tone source is normally associated with each of the trunks at the distant end thereof to identify the idle condition of the trunk at the local end. Thus the necessity for complex controls and apparatus for connecting a test source of tone to a trunk, after its idle condition has been determined, is eliminated and transmission measurement is initiated immediately upon seizure of an idle trunk by the test equipment. The test source of tone which is normally connected to the trunk to mark the trunk idle is automatically disconnected from the trunk when the latter is seized for speech transmission purposes.

In accordance with other features, the transmission measuring circuit of this invention functions to successively test each trunk of a group and connect the idle trunks thereof to the transmission measuring portion of the test circuit; to automatically measure the level of the received single frequency tone; to give an audible and visual alarm if the level of the received tone departs, for example by ±2 db or more, from the required level; to prevent an alarm being given if the trunk is busy and no tone is being transmitted; to display the terminal number of the automatic transmission circuit that is connected to the trunk being tested; to provide means for connecting the transmission measuring circuit to the trunk being tested; to provide means for halting the automatic transmission circuit at any desired trunk; to provide means for retiring the audible alarm; to provide means for advancing the automatic transmission measuring circuit to the next terminal if an alarm condition is encountered; and to provide means for monitoring the trunk under test.

These and other features of the invention will be readily understood from the following detailed description when read with reference to the accompanying drawings in which:

Fig. 2 is a circuit diagram illustrating a pair of stepping switches, a crossbar switch, signalling means, and a pair of transfer relays all of which function to seize multiples of the trunks of Fig. 1 successively for test purposes, and for identifying the seized trunk;

Fig. 4 is a block diagram indicating the manner in which Figs. 1, 2 and 3 are to be arranged to effect a circuit diagram of a complete system involving the features of the invention.

Figure 1:
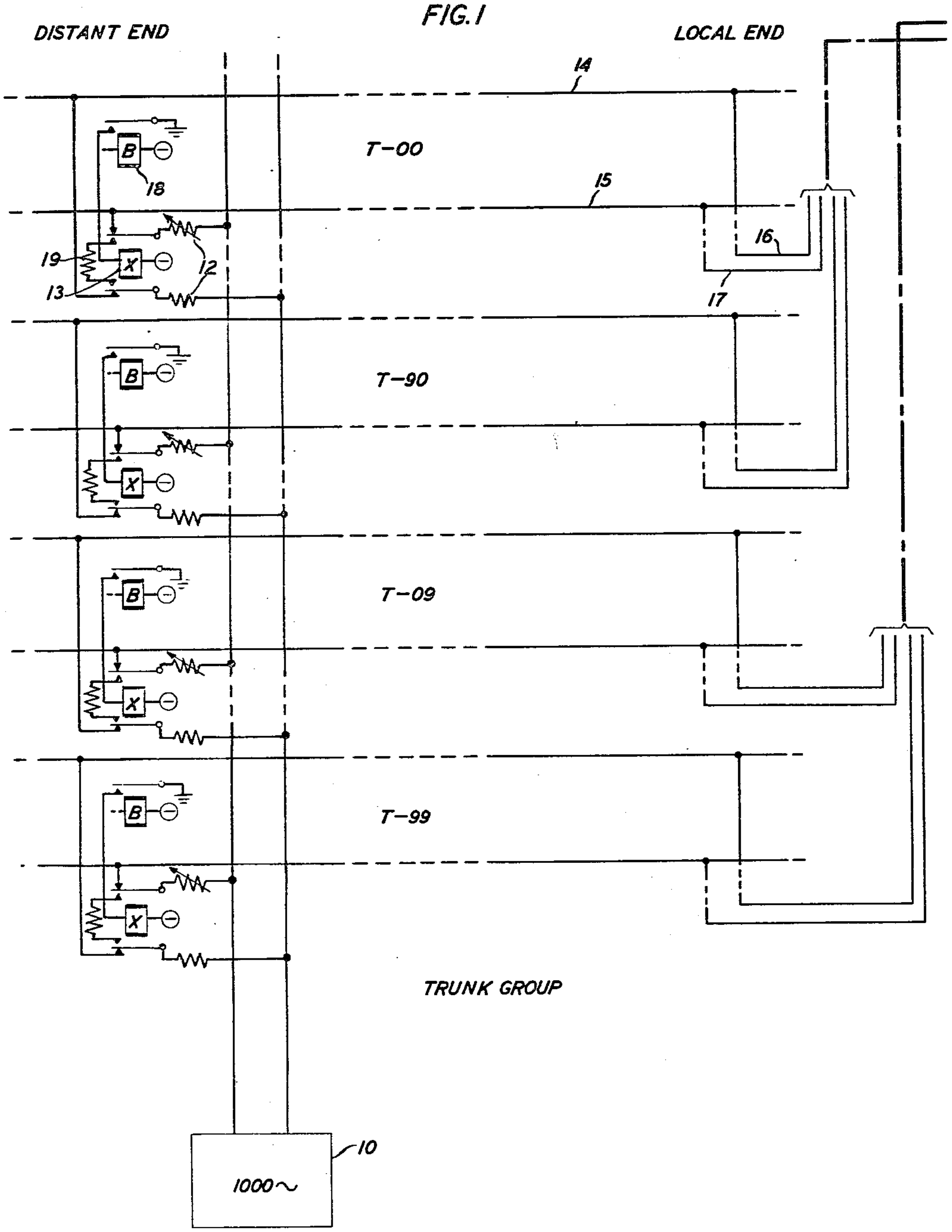
Fig. 1 is a circuit diagram illustrating a plurality of trunk circuits of a particular trunk group, the distant end of each of which has normally connected thereto a common source of single frequency tone current which identifies the idle condition of the trunk at its local end.

Before entering into a detailed description of the operation of the complete system disclosed in the drawings, a brief description of the operation of the trunk finder TF and of the selector switches S, H and A will be given.

Figures 2, 4:
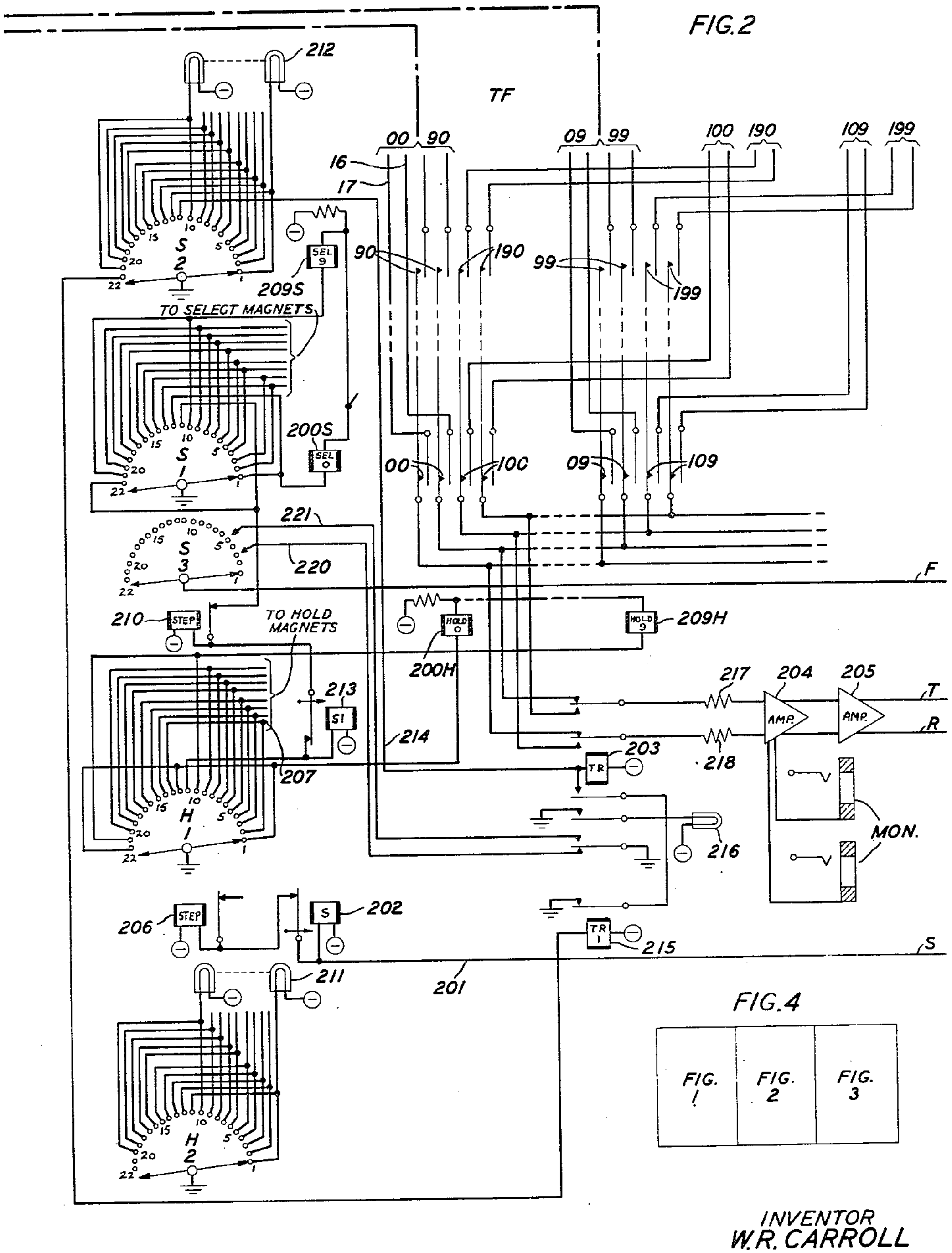

The trunk finder TF is essentially a crossbar type switch with ten select magnets, 200S to 209S, of which only magnets 200S and 209S are shown, and ten hold magnets, 200H to 209H, of which only magnets 200H and 209H are shown. In accordance with well-known crossbar switch operation, the joint operation of any one select magnet and any one hold magnet results in the closure of a group of circuit controlling crosspoints. For example, and with reference to Fig. 2, the operation of select magnet 200S, followed by the operation of hold magnet 200H results in the closure of crosspoints 00 and 100 which identify trunks T–00 and T–100. The operation of select magnet 200S also prepares other crosspoints, such as crosspoints 09 and 109 for closure, but the actual closure of such other crosspoints requires also the operation of an associated hold magnet such as hold magnet 209H. Similarly, all other select magnets such as 209S prepare a multiplicity of crosspoints, such as crosspoints 90, 190, 99 and 199 for operation but the actual completion of closure of such other crosspoints requires the subsequent operation of a corresponding one of the hold magnets, such as magnets 200H to 209H. With the arrangement illustrated, two hundred trunk selections are possible there being two hundred crosspoints 00 to 199, each identifiable with a particular trunk.

All trunk-identifying crosspoints 00 to 99 are associated with the upper back contacts of relay 203 whereas all trunk-identifying crosspoints 100 to 199 are associated with the upper front contacts of relay 203 so that the first group of trunks T–00 to T–99 are extended to the transmission measuring circuit only when relay 203 is unoperated and the second group of trunks T–100 to T–199 will be extended to the transmission measuring circuit only when relay 203 is operated.

Figure 3:
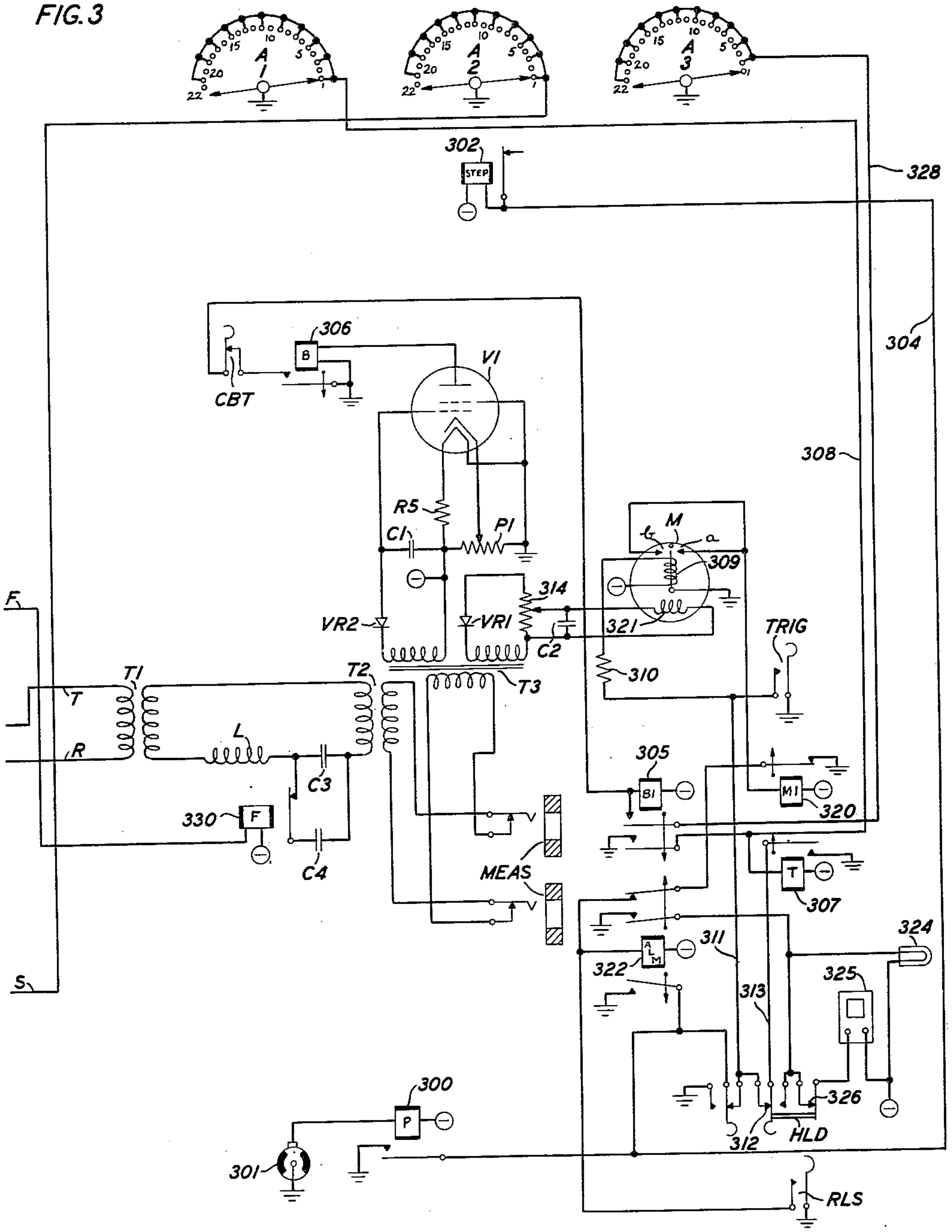
Fig. 3 is a circuit diagram of the transmission measuring circuit, per se, which, under control of the apparatus of Fig. 2 is adapted to be successively associated with the trunks of Fig. 1.

The selector switch A (Fig. 3) functions under control of stepping magnet 302 which, in turn, is controlled over conductor 304 by relay 300, which operates under control of interrupter 301. In order better to describe the functioning of the selectors A, H and S, it will be assumed that each is in its No. 1 position and that relays 300 and 202 are operated, the latter being operated in a circuit extending from negative battery, through the winding of relay 202, over conductor 201, to ground by way of the No. 1 terminal of arc 2 of switch A and the associated brush. Select magnet 200S is operated under control of the No. 1 terminal and brush of arc 1 of switch S, while hold magnet 200H is similarly operated under control of the No. 1 terminal and brush of arc 1 of switch H. With select magnet 200S and hold magnet 200H operated, the crosspoints designated 00 and 100 are closed so that the trunk T–00 (Fig. 1) is now cut through to the upper back contacts of transfer relay 203 whose associated armatures connect with the automatic transmission measuring circuit. Lamp 211 is lighted under control of the No. 1 terminal and brush of arc 2 of selector H while lamp 212 is similarly lighted under control of the No. 1 terminal and brush of arc 2 of selector S. The lamps 211 and 212, when lighted simultaneously, identify trunk T–00 as will be described in greater detail hereinafter.

It is understood, as indicated above, that the joint operation of select magnet 200S and hold magnet 200H results also in the closure of crosspoints 100 of switch TF which are connected to the upper front contacts of relay 203 which, at this time, are open so that the trunk T–100, which corresponds to these crosspoints, is not cut through to the automatic transmission measuring circuit.

All odd positions of selector A are characterized as the "select trunk and busy test" positions and all even positions as the "transmission test" positions. The A selector remains in each position for approximately two seconds under control of interrupter 301. When relay 300 releases, selector A steps to position No. 2 removing ground from conductor 201 and causing relay 202 to release. The next operation and release of relay 300 causes the selector A to step to position No. 3 thereby again applying ground to the lead 201 and causing stepping magnet 206 to operate and to advance the selector H to position No. 2 when relay 202 operates. Relay 202 is required to cause selector H to step to the next position while selector A is still in an odd or "select trunk and busy test" position in order that the transmission measuring circuit can pre-test the trunk for busy while selector A moves into the measure or "transmission test" position. This is necessary in order to release relay 305 when passing from a busy trunk to an idle trunk as will appear more fully from a later description. With selector H in position No. 2, the next hold magnet (not shown) is operated to close crosspoints of switch TF corresponding to trunks T–01 and T–101 (not shown) and connecting them to the upper contacts of relay 203.

The action just described continues until selector H reaches terminal No. 11. In this position, ground from arc 1 operates relay 213 and stepping magnet 210 in obvious circuits, causing selector S to advance to position No. 2. Relay 213 is required to permit selector S to step and operate a select magnet while the hold magnets are released. When selector H steps to terminal No. 12, ground from arc 1 operates the hold magnet 200H for the second time to again connect the crosspoints 00 and 100 to the upper contacts of relay 203.

This action continues until selector S reaches terminal No. 11. In this position ground on arc 1 causes the selector to self-interrupt to terminal No 12, the operating circuit for stepping magnet 210 being obvious. Ground on arc 2 of selector S in passing over terminal No. 11 operates relay 203 in an obvious circuit. Relay 203 locks operated under control of relay 215. With relay 203 operated and select magnet 200S and hold magnet 200H operated, the crosspoints 100 of switch TF are effectively cut through to the transmission measuring circuit.

When the selector S reaches terminal No. 22, ground on arc 1 causes the selector to self-interrupt to position No. 1. Ground on arc 2 of selector S in passing over terminal No. 22 operates relay 215 momentarily, causing the release of relay 203. The lamps, such as lamps 211 and 212 associated with arcs 2 of selectors H and S, respectively, and lamp 216, controlled by relay 203, identify the trunk terminal that is connected to the transmission measuring circuit.

Thus it will be noted that selector A operates under control of interrupter 301 and functions in such a manner as to cause selector H to advance from position to position successively, with each step occurring while selector A is in a "select trunk and busy test" position. For each of the first ten positions of selector H, a different hold magnet is operated and for each ten steps of selector H, selector S is advanced one step to operate a corresponding select magnet. Thus, the ten select magnets are operated successively and, during the operated interval of each select magnet, the ten hold magnets are operated successively; so that, with the arrangement disclosed and involving ten select magnets and ten hold magnets, a total of 100 trunk seizures is possible for each position of the transfer relay 203; that is, 100 seizures are possible during the time the relay is in its release position and 100 other seizures are possible during the interval in which the relay is in its operate position.

It will be observed that the lamp signals associated with arc 2 of selector S, such as lamp 212, identify the tens digits of the trunk identifications and the lamps associated with arc 2 of selector H, such as lamp 211, identify the units digits of the trunk identifications so that the conjoint operation of any two lamps of such groups identifies the trunk numerical designation. For example, lamp 212 corresponds to the tens digit or zero and lamp 211 to the units digit zero so that the simultaneous lighted condition of these two lamps identifies trunk T–00. It will be further noted that each group of lamps serves two groups of ten trunks so that on the second cycle of operation lamps 212 and 211 would be relighted upon seizure of trunk T–100, that is, the trunk whose numerical designation corresponds to the crosspoints 100. The hundreds digit in such a case is identified by the lighted condition of lamp 216 which lamp is controlled by relay 203 which, in turn, is operated only when the switches S and H are serving the second group of trunks T–100 to T–199.

The transmission measuring circuit involves a sensitrol relay M having an operating winding 1 and a reset magnet 309 and is normally adjusted so as to control the alarms in such a manner that an alarm is manifested only when the operating winding of the relay is subjected to a direct-current voltage in excess of that which identifies, within certain limits, a measured transmission level in excess of or less than a predetermined level.

*Measuring an idle trunk that is within limits*

For this description it will be assumed that selector A is in position No. 1, that is, in a "select trunk and busy test" position. Under this assumed condition and as fully described hereinbefore, the crosspoints 00 of switch TF which identify the trunk T–00 (Fig. 1), are cut through to the control and alarm circuit by way of the back contacts and upper armatures of relay 203. Thus the trunk T–00 is connected through to the input transformer T1 by way of resistances 217 and 218, and the two amplifiers 204 and 205 in tandem.

In the assumed idle condition of the trunk T–00, single frequency tone current from the source 10 is fed through the resistance network 12, over the back contacts of relay 13 and thence over the tip and ring conductors 14 and 15 of the trunk, conductors 16 and 17, crosspoints 00 of switch TF, upper back contacts and corresponding armatures of relay 203, resistances 217 and 218, amplifiers 204 and 205, thence through the filter consisting of transformer T1, inductance L, condensers C3 and C4, transformers T2 and T3 and is rectified by varistor VR2. The negative half of the cycle of tone current charges condenser C1 to about 50 volts, cutting off tube V1 and releasing relay 306, if this relay was operated.

Relay 306, released, releases relay 305 which removes ground from relay 307. Relay 307, however, does not release, as it is held operated from ground at arc 1 of selector A which is extended to the winding of relay 307 by way of conductor 308. Relay 307, operated, energizes the reset magnet 309 of sensitrol relay M over a circuit extending from negative battery through the magnet 309, resistance 310, conductor 311, contacts 312 of key HLD, conductor 313, armature and front contact of relay 307, to ground. The energization of reset magnet 309 prevents the armature of relay M from engaging either of its associated contacts *a* and *b*.

The incoming tone from source 10 is also rectified by the varistor VR1 and appears as direct-current voltage across potentiometer 314. The potentiometer 314 is adjusted so that a tone level of −25 dbm at the crosspoints 00 of the switch TF will cause the sensitrol relay M to read 0 dbm, indicating a zero deviation from the required tone level. When the selector A steps to the even or measure position No. 2, relay 307 releases and de-energizes the reset magnet of relay M. If the received tone is within ±2.0 dbm of the required level, no other action takes place and with the release of relay 300 selector A steps to position No. 3.

If the trunk T–00 happened to be seized for speech transmission purposes during the measuring period, relay 18 in the trunk operates, in any well-known manner, in response to the seizure and completes an operating circuit for relay 13. Relay 13, operated, disconnects the tone source 10 from the trunk and terminates the tone source 10 with resistance 19. The removal of the tone from the trunk renders the tube VI (Fig. 3) operative so that relay 306, in the plate circuit of the tube, operates causing relay 305 to operate in an obvious circuit. Relay 305 locks to ground at terminal No. 2 and the brush of arc 3 of selector A by way of conductor 328.

*Measuring an idle trunk that is outside limits*

The action under the present assumed condition is the same as described immediately above until relay 307 releases to remove the trigger ground from the reset magnet 309 of relay M. If the transmission level of trunk T–00 is outside predetermined limits by more than 2 db, relay M will close one of its contacts *a* or *b* to complete an obvious operating circuit for relay 320. As previously indicated, the received tone is rectified by varistor VR1 and appears across the potentiometer 314 as a direct-current voltage which is impressed on the operating winding 321 of relay M and the potentiometer adjustment is such that any deviation in level beyond ±2.0 db of the required level will result in the response of the operating coil 321 thereto and in a corresponding movement of the armature into engagement with either contact *a* or *b* depending upon the direction of the deviation.

Relay 320, operated, releases the normally operated alarm relay 322. At its lower armature and back contact, relay 322 applies continuous ground to conductor 304 to prevent further stepping of selector A. At its inner upper armature, relay 322 completes operating circuits for the visual alarm signal 324 and for the audible signal 325, the latter circuit including the contacts 326 of key HLD. The audible signal may be retired by operating the key HLD. The identity of the trunk under test will be indicated by lighted lamps such as lamps 211 and 212.

After the trunk has been adjusted to the required level, or removed from the measuring circuit by blocking the crosspoints 00 (if the trunk involved is trunk T–00) at the switch TF, operation of key TRIG will apply ground to the reset magnet 309 of relay M to reset the relay, and key HLD may then be restored to normal. Release key RLS is now operated to cause relay 322 to reoperate and remove the steady ground from conductor 304 whereupon selector A resumes stepping under control of interrupter 301.

*Busy trunks*

If the tested trunk is busy when the trunk finder TF connects it to the transmission measuring circuit, no tone will be received and there will be no bias applied to tube V1. Relay 306, therefore, will operate and will, in turn, operate relay 305. Relay 305, operated, grounds relay 307 but relay 307 is held operated at this time by ground from arc 1 of selector A over conductor 308. When the selector A steps to the measure or test position, relay 305 will lock to ground from arc 3 of selector A over conductor 328 to prevent the operation of relay M in case the trunk should become idle during the measuring period. Since relay 322 does not release under this condition to apply steady ground to conductor 304, the switch A continues to step.

*Tone supply*

The single frequency tone source 10 is connected to the distant end of each trunk in the manner described and its association with the trunk is controlled by a relay 18 which recognizes a trunk seizure. The frequency of this tone is indicated to be 1000 cycles. Tone of a frequency different from that connected at the far end is connected at the near end of the trunk by similar means for two-way operation. It is deemed unnecessary to an understanding of the present invention to show the near or local end of the trunk so equipped. Suffice it to say that these tones are removed when the trunk is seized at either end for communication purposes. The level of the tone applied to the trunk is −20 dbm, plus or minus 4 dm and is adjustable by means of a potentiometer included, for example, in the resistance network 12 (Fig. 1). The potentiometer is adjusted to give a level at the receiving end of −25 dbm as previously indicated.

The conductors 220 and 221 (Fig. 2) are provided for the purpose of identifying those levels of the trunk finder switch TF on which appear trunks that may receive a different frequency such, for example, as 1300 cycles. These conductors are connected, as required, to the terminals of arc 3 of selector S to cause the operation of relay 330, Fig. 3) when such switching levels are encountered. Relay 330, operated, opens the circuit to the condenser C4 in the filter associated with the transmission measuring circuit and thus alters the character of this filter. This is necessary to prevent the tone transmitted from the near end from interfering with the received tone.

The key HLD provides means for holding the trunk finder TF on any trunk for monitoring or other purposes.

The monitoring jacks MON are provided to allow the test man to monitor the trunks being measured. The monitoring circuit is one of high impedance and does not affect the operation of the measuring circuit.

The jacks MEAS are provided to allow the test man to determine the number of dbs a trunk has deviated from the required level. Any suitable impedance type transmission measuring set may be used for this purpose. With such a transmission measuring set plugged into the jacks and with all keys normal, the automatic transmission measuring circuit will continue to step from one trunk to another. The connected transmission measuring set can be read as each idle trunk is passed over and a record of the deviation from a specified net loss recorded.

Key CBT is provided to permit the detection of trunks that are out of service and have not been reported on. During light load periods, the automatic transmission measuring circuit may be used with this key operated, in which case it will stop on any trunk that does not have tone present at the receiving end. The test man can then determine, by monitoring, if the trunk is in trouble.

What is claimed is:

1. In a transmission measuring system, a group of signaling circuits each having a test appearance at one end, a source of test current normally connected to each signaling circuit at its other end to mark the corresponding signaling circuit idle at the test appearance thereof, a transmission measuring circuit, means for successively connecting said transmission measuring circuit to said signaling circuits by way of their corresponding test appearances, and means included in said transmission measuring circuit immediately responsive to the connection of said transmission measuring circuit to the test appearance of an idle one of said signaling circuits for measuring the level of the test current at the test appearance of the said idle signaling circuit and detecting a departure therein from a predetermined level.

2. A transmission measuring system according to claim 1 which includes an alarm, and means for operating said alarm when the detected departure in level of the test current at the test appearance of the idle signaling circuit from a predetermined level is in excess of a predetermined magnitude.

3. In a transmission measuring system, a group of signaling circuits each having a test appearance at one end, a source of test current normally connected to each signaling circuit at its other end to mark the corresponding signaling circuit idle at the test appearance thereof, a transmission measuring circuit, stepping means, switching means controlled by said stepping means for connecting said transmission measuring circuit to the test appearances of said signaling circuits successively, continuously operating means controlling the operation of said stepping means, means included in said transmission measuring circuit responsive to the connection of said transmission measuring circuit to the test appearance of an idle one of said signaling circuits for detecting a deviation of predetermined magnitude in the level of the test current at the test appearance of the idle signaling circuit and for rendering said stepping means unresponsive to said continuously operating means, and manually operable means for rendering said stepping means responsive to said continuously operating means.

4. The combination in a transmission measuring system of a group of trunks each having a test terminal at one end, a source of low frequency test current normally connected to each trunk at its other end to mark the corresponding trunk idle at its associated test terminals, a transmission measuring circuit including a level indicator having a reset coil, an operate coil and a contact controlling armature, an alarm controlled by said armature when in a contact closing position, means for successively connecting said transmission measuring circuit to said trunks by way of their test terminals, means effective prior to each connection of said transmission measuring circuit to said trunks for energizing the reset coil of said level indicator to thereby disable said indicator, means responsive to the connection of each of said trunks, when idle, for de-energizing the reset coil of said indicator and simultaneously subjecting the operating coil thereof to a direct-current voltage commensurate with the level of the low frequency test current at the connected test terminals of the connected idle trunks, whereby said indicator is enabled to register deviations in level from a predetermined level and to effect the operation of its armature to contact closing position to effect the operation of said alarm.

5. The combination of a group of trunks, the idle condition of each of which is characterized by the connection, at one end thereof, of a source of test tone and each of which is terminated, at the other end, at test terminals at which the level of the connected tone source is indicative of the transmission efficiency of the trunk, and means for testing the transmission efficiency of said trunks comprising a transmission measuring circuit, means included in said transmission measuring circuit for detecting tone levels which deviate from a predetermined level, means for connecting said transmission measuring circuit momentarily to the test terminals of said trunks in succession, means automatically responsive to the connection of said transmission measuring circuit to an idle trunk at the test terminals of which the tone level varies from the said predetermined level by an amount in excess of a predetermined amount for sustaining the connection of said transmission measuring circuit to the said idle trunk, and means identifying the idle trunk connected to said transmission measuring circuit.

6. The combination according to claim 5 which includes means responsive to the seizure of a trunk for communication purposes for disconnecting the test tone from the trunk.

7. In a transmission measuring system, a group of trunks, each trunk terminating at one end in test terminals, a source of tone current normally connected to each trunk at its other end to mark the trunk idle, a transmission measuring circuit including a level indicator having a zero setting, a stepping switch having odd and even terminal positions, other switching means controlled by said stepping switch for successively connecting said transmission measuring circuit to the test terminals of said trunks, means responsive to the connection of said transmission measuring circuit to the test terminals of an idle trunk when said stepping switch is in an odd terminal position for insuring the zero setting of said level indicator, means for advancing said stepping switch to an even terminal position in which said indicator setting means is disabled and said indicator enabled, and means for subjecting said indicator to a direct-current voltage commensurate with the level of the test tone connected to the idle trunk, to cause said indicator to operate when said indicator is enabled, and means controlled by said indicator for manifesting the operation of said indicator.

No references cited.